H. W. STEVENS.
CONTROLLER FOR ELECTRIC MOTORS.
APPLICATION FILED DEC. 26, 1919.
1,419,178. Patented June 13, 1922.
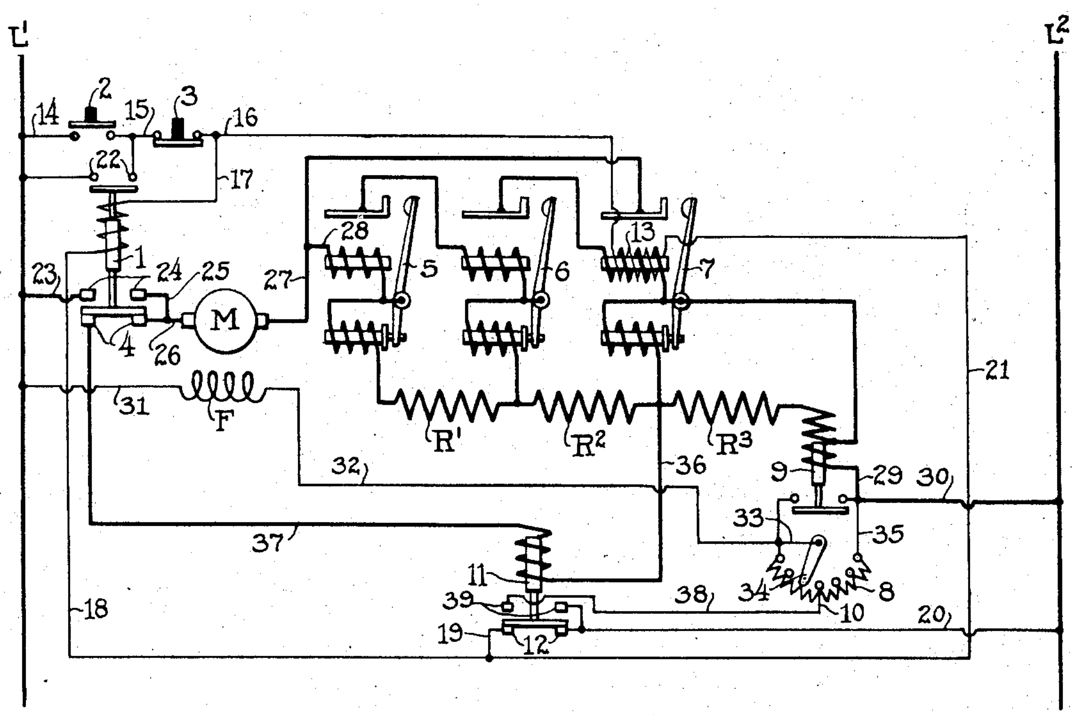
INVENTOR.
Harold W. Stevens
BY
Frank H. Hubbard
ATTORNEY

UNITED STATES PATENT OFFICE.

HAROLD W. STEVENS, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER FOR ELECTRIC MOTORS.

1,419,178. Specification of Letters Patent. Patented June 13, 1922.

Application filed December 26, 1919. Serial No. 347,303.

*To all whom it may concern:*

Be it known that I, HAROLD W. STEVENS, a citizen of the United States, residing at Milwaukee, in the county of Milwaukee and State of Wisconsin, have invented new and useful Improvements in Controllers for Electric Motors, of which the following is a full, clear, concise, and exact description, reference being had to the accompanying drawing, forming a part of this specification.

This invention relates to controllers for electric motors and particularly to dynamic braking controllers for motors subjected to speed regulation through variation in shunt field excitation.

In effecting the aforesaid control, difficulty has heretofore been encountered in securing uniform stopping of the motor under dynamic braking following acceleration thereof to different degrees through field weakening, since the field excitation corresponding to the higher speed is ordinarily inadequate to overcome the increased momentum of the motor armature due to such speed within a reasonable time interval.

The present invention has among its objects that of obviating such difficulty of controllers of the character stated by providing for adequate shunt field excitation for dynamic braking under all speed conditions determinable by field excitation variation.

Another object is that of providing a controller operable automatically upon initiation of dynamic braking action to effect substantially maximum excitation of the shunt field of the controlled motor for all motor speeds below a predetermined speed, and to effect a lesser degree of field excitation for higher speeds.

Another object is that of providing a controller operable automatically to effect strengthening of the shunt field of the controlled motor for dynamic braking, and within a predetermined speed range to render the amount of such strengthening inversely proportional to the speed prior to dynamic braking.

Another object is that of providing a controller of the aforesaid character utilizing certain units of armature resistance for limiting circuit peaks both during accelerating and dynamic braking, wherein provision is made for restarting of the motor upon stopping and dynamic braking thereof only following prior reinclusion in circuit of the total value of armature resistance and restoration of the shunt field to a predetermined strength.

Referring to the drawing, the same illustrates a motor M to be supplied with current from lines L′, $L^2$ and provided with a shunt field F and steps of accelerating resistance R′, $R^2$, $R^3$, the motor circuit being controllable through an electro-responsive main switch 1 and start and stop push buttons 2 and 3, said switch also serving by means of down contacts 4 thereof to control a dynamic braking circuit for the motor. Lockout switches 5, 6, and 7 are adapted to effect progressive exclusion of the various steps of armature resistance for motor acceleration, the steps R′ and $R^2$ of such resistance being furthermore adapted to be included initially and progressively excluded during dynamic braking.

The circuit of shunt field F is provided with an adjustable rheostat 8 adapted to be short circuited upon closure of a vibrating relay 9 having its winding subjected to energization by the motor current during running but not during dynamic braking.

Said field rheostat is provided with a centrally located tap 10 having line connections controllable by a normally open field strengthening relay 11 having its closing winding connected in the dynamic braking circuit of the motor and adapted during dynamic braking to short circuit a value of the rheostat resistance determined by the setting of the rheostat arm for running. Said relay 11 also serves by means of down contacts 12 to control the continuity of the energizing circuit of main switch 1 and of a holding winding 13 for lockout switch 7.

The several switches being in the relative positions illustrated, closure of the starting push button completes the energizing circuit of the main switch from line L′ by conductor 14 through said starting button, by conductor 15 through the stop button, thence by conductors 16 and 17 through the winding of the main switch, by conductors 18 and 19 through the down contacts of field strengthening relay 11, thence by conductor 20 to line $L^2$. The energizing circuit of holding winding 13 is simultaneously completed, said circuit extending through the start and stop push buttons as formerly traced, thence by conductor 16 through said holding winding, by conductors 21 and 19 through the field strengthening relay and thence to line L′, as formerly traced. Said holding winding, however, being incapable of effecting closure of the lockout switch, energization thereof produces no immediate result.

The main switch, however, immediately closes and maintains itself and said holding winding through auxiliary contacts 22. Such closure completes the motor circuit from line L′ by conductor 23 through up contacts 24 of said main switch, thence by conductors 25 and 26 through the motor, by conductors 27 and 28 through the windings of lockout switch 5, thence in series through resistances R′, $R^2$ and $R^3$, and through the winding of the vibrating relay 9, thence by conductors 29 and 30 to line $L^2$. Said relay thereupon closes, short circuiting the field rheostat and providing full field strength for starting, and the motor is thereafter adapted to accelerate under the action of the lockout switches in a well known manner. Lockout switch 7 upon closing serves to short circuit the windings of all the lockout switches and a portion of the winding of the vibrating relay 9. Said lockout switch is thereafter maintained closed by holding winding 13 and said relay is thereafter adapted to vibrate during further acceleration of the motor due to the field weakening so effected. When the motor has attained the speed predetermined by the rheostat setting said relay is adapted to cease its vibration and to remain open during normal running.

The shunt field circuit extends from line L′ by conductor 31 through said field winding, thence by conductor 32 to the field rheostat and (assuming the vibrating relay to be in open position) by conductor 33 through rheostat arm 34 and a portion of the resistance determined by the rheostat setting, thence by conductors 35 and 30 to line $L^2$.

Opening of the stop button serves to deenergize both the winding of main switch 1 and holding winding 13 of lockout switch 7 through opening of their joint maintaining circuit, both of said switches being thereupon adapted to open, lockout switches 5 and 6 having previously opened at the time of closure of lockout switch 7.

The main switch upon opening serves, by means of its down contacts 4, to complete the dynamic braking circuit of the motor, said circuit extending from the right hand motor brush through the windings of lockout switch 5 and through resistances R′ and $R^2$ as formerly traced, thence by conductor 36 through the winding of the field strengthening relay 11, thence by conductor 37 through said down contacts of the main switch and thence to the left hand motor brush. Lockout switches 5 and 6 are thereafter adapted to function as during acceleration.

Closure of the dynamic braking circuit during operation of the motor thus serves to energize the winding of the field strengthening relay, which is thereupon adapted to close and remain closed so long as current flows in said circuit. Closure of said relay serves to connect the tap 10 of the field rheostat to line $L^2$ by connections extending from said tap by conductor 38 through up contacts 39 of said relay and thence by conductor 20 to line $L^2$.

The circuit connections last described serve during dynamic braking to reduce field weakening by the rheostat, and to different degrees depending upon the rheostat setting. Thus, for positions of the rheostat arm to the right of tap 10 two parallel paths are provided for the field current, one being the normal path as aforedescribed, and the other being from said arm to the tap and thence to line $L^2$ as last traced, whereby obviously the effective resistance under such conditions is so far reduced as to become practically negligible. Further, assuming positioning of the arm in register with the tap the effective resistance of the rheostat becomes zero.

Also, it it apparent that for positions of the arm to the left of the tap the resistance effective during dynamic braking is that included between said arm and said tap, and that for such position of the arm the braking field strength is inversely proportional to the motor speed as determined by the rheostat setting.

Such graduated reduction in the braking field strength for the higher motor speeds constitutes an exceedingly important feature of protection since the ordinary motor may not be safely subjected to full field excitation for braking at speeds higher than that corresponding to half the maximum acceleration attainable through field weakening.

Closure of said field strengthening relay also serves to disconnect its down contacts 12 thereby interrupting the joint return connection of the closing winding of main switch 1 and of holding winding 13. This expedient effectively prevents either electromagnetic closure of the main switch or holding in of lockout switch 7 so long as current flows in the dynamic braking circuit, thus preventing re-connection of the motor to the line by means of the starting push button prior to stopping thereof under the dynamic brake and also providing for inclusion of the total armature resistance in circuit upon closure of said main switch.

Finally opening of the field strengthening relay 11 which thus necessarily precedes reenergization of the main switch serves to interrupt the short circuit from tap 10 to line $L^2$, whereas the initial inrush of current to the motor effects closure of vibrating relay 9, thus providing full field strength for starting.

What I claim as new and desire to secure by Letters Patent is:

1. In a dynamic braking controller for an electric motor having a shunt field, the combination with means for controlling the speed of the motor through field excitation regulation and means to act upon said former means for causing the same to effect a different character of regulation during dynamic braking.

2. In a dynamic braking controller for an electric motor having a shunt field, the combination with means for varying the field excitation progressively for controlling the speed of the motor, of automatic means to act upon said former means for proportioning the excitation of said field during dynamic braking to the running field excitation made prior to dynamic braking.

3. In a dynamic braking controller for an electric motor having a shunt field, the combination with adjustable means to vary the field excitation for selectively controlling the running speed of the motor, of means to act upon said former means during dynamic braking for automatically increasing the field excitation to different values determined by the speed selecting setting of said former means.

4. In a dynamic braking controller for an electric motor having a shunt field, the combination with field excitation varying means for selectively controlling the running speed of the motor, of means to act automatically upon said former means to render the field excitation for dynamic braking inversely proportional to the running speed selected by said former means, for running speeds within a predetermined range.

5. In a dynamic braking controller for an electric motor having a shunt field, the combination with field excitation varying means for selectively controlling the running speed of the motor, of means to act automatically upon said former means to render the field excitation for dynamic braking inversely proportional to the running speed selected by said former means, for running speeds within a predetermined range and to provide substantially maximum field excitation for dynamic braking at running speeds outside said range.

6. The combination with an electric motor having a shunt field and circuit connections providing for dynamic braking, of field excitation varying means for controlling the running speed of said motor, and means to act upon said former means during dynamic braking for automatically varying the control effected thereby.

7. The combination with an electric motor having a shunt field and circuit connections providing for dynamic braking, of field weakening accelerating means for said motor and means to act upon said former means during dynamic braking for automatically causing the same to weaken the field to a lesser degree.

8. The combination with an electric motor having a shunt field and circuit connections providing for dynamic braking, of a rheostat to be included in the circuit of said field during running and means operable automatically to connect an intermediate point of said rheostat to the line to provide for adequate field excitation during dynamic braking.

9. In a dynamic braking controller, the combination with an electromagnetically controlled main switch and armature resistance adapted to limit surges of motor current both for acceleration and dynamic braking, of means providing against electromagnetic closure of the main switch during dynamic braking and pending operation of the controller to include a predetermined value of said resistance in circuit.

10. The combination with an electric motor having a shunt field and circuit connections providing for dynamic braking, of field weakening means for effecting acceleration of the motor, and means providing against connection of the motor to the line during continuance of dynamic braking action and pending operation of the controller to provide a predetermined field strength for starting.

11. The combination with an electric motor having a shunt field and circuit connections providing for dynamic braking, of field weakening means for effecting acceleration of the motor, armature resistance for limiting surges of motor current both for starting and dynamic braking, and means providing against line connection of the motor during continuance of dynamic braking action and pending action to provide a predetermined field strength and inclusion of a predetermined value of said resistance in circuit with the motor.

In witness whereof, I have hereunto subscribed my name.

HAROLD W. STEVENS.